(12) United States Patent
Tan

(10) Patent No.: US 9,003,072 B2
(45) Date of Patent: Apr. 7, 2015

(54) PORTABLE DATA STORAGE DEVICE WITH WIRELESS FUNCTIONALITY HAVING A DIGITAL SWITCH CIRCUIT AND A METHOD FOR STORING DATA IN THE AFOREMENTIONED

(75) Inventor: Winn Tan, Singapore (SG)

(73) Assignee: T-Data Systems (S) Pte Ltd, Singapore (SG)

( * ) Notice: Subject to any disclaimer, the term of this patent is extended or adjusted under 35 U.S.C. 154(b) by 0 days.

(21) Appl. No.: 13/982,992

(22) PCT Filed: Feb. 2, 2011

(86) PCT No.: PCT/SG2011/000050
§ 371 (c)(1),
(2), (4) Date: Jul. 31, 2013

(87) PCT Pub. No.: WO2012/105906
PCT Pub. Date: Aug. 9, 2012

(65) Prior Publication Data
US 2014/0040511 A1     Feb. 6, 2014

(51) Int. Cl.
*G06F 3/06*      (2006.01)
*G06F 13/40*    (2006.01)
*G06F 13/00*    (2006.01)

(52) U.S. Cl.
CPC .............. *G06F 3/0634* (2013.01); *G06F 3/061* (2013.01); *G06F 3/0673* (2013.01); *G06F 13/4022* (2013.01)

(58) Field of Classification Search
None
See application file for complete search history.

(56) References Cited

U.S. PATENT DOCUMENTS

2011/0307906 A1* 12/2011 Varanda et al. ............... 719/323
2013/0253880 A1*  9/2013 Joseph et al. ................. 702/150

* cited by examiner

*Primary Examiner* — Scott Sun
(74) *Attorney, Agent, or Firm* — Schiff Hardin LLP

(57) ABSTRACT

There is provided a portable data storage device with wireless functionality. The portable storage device includes a digital switch circuit for controlling a flow of data in the portable storage device; a non-volatile memory module coupled to the digital switch circuit, the non-volatile memory module being for storing data; an interface coupled to the digital switch circuit for enabling the portable data storage device to be used for data transfer with a host device; a microcontroller coupled to the digital switch circuit for controlling the digital switch circuit; and a wireless communications module coupled to the microcontroller for wireless transmission/reception of data. The microcontroller is configured to toggle amongst a plurality of discrete modes of the digital switch circuit such that in at least one of the plurality of discrete modes the digital switch circuit diverts data away from the microcontroller to reduce a processing load on the microcontroller. A corresponding method is also disclosed.

10 Claims, 2 Drawing Sheets

PORTABLE DATA STORAGE DEVICE WITH WIRELESS FUNCTIONALITY HAVING A DIGITAL SWITCH CIRCUIT AND A METHOD FOR STORING DATA IN THE AFOREMENTIONED

FIELD OF INVENTION

This invention relates to a portable data storage device with wireless functionality and method for the storage and wireless transceiving of data using the portable data storage device.

BACKGROUND

Portable data storage devices in the form of memory card devices are amongst the most ubiquitous types of data storage devices in use nowadays. One of the reasons for their popularity is because these memory card devices come in various form factors (also known as card formats) which enable the memory card devices to be used in many types of consumer electronic devices, such as for example, a digital camera, a mobile phone, a positioning-navigation apparatus, a desktop computer, a portable computer and so forth.

The internal circuitry of the memory card devices is substantially similar in the memory card devices regardless of form factor. A typical configuration for the internal circuitry of the memory card devices relates to a setup whereby data has to pass through a microcontroller for each and every instance when the memory card device is accessed by the consumer electronic device which the memory card device is connected to, and this continual use of the microcontroller leads to unnecessary power being drained from the consumer electronic device and unnecessary heat generated by the microcontroller.

It would be desirable for users of the consumer electronic devices if the microcontroller of the memory card device did not drain unnecessary power (which would shorten a battery life of the consumer electronic device) and generate unnecessary heat (which would damage internal components of the consumer electronic device).

SUMMARY

In a first aspect, there is provided a portable data storage device with wireless functionality. The portable storage device includes a digital switch circuit for controlling a flow of data in the portable storage device; a non-volatile memory module coupled to the digital switch circuit, the non-volatile memory module being for storing data; an interface coupled to the digital switch circuit for enabling the portable data storage device to be used for data transfer with a host device; a microcontroller coupled to the digital switch circuit for controlling the digital switch circuit; and a wireless communications module coupled to the microcontroller for wireless transmission/reception of data.

It is advantageous that the microcontroller is configured to toggle amongst a plurality of discrete modes of the digital switch circuit such that in at least one of the plurality of discrete modes the digital switch circuit diverts data away from the microcontroller to reduce a processing load on the microcontroller.

The plurality of discrete modes of the digital switch circuit may be a first mode for data storage/retrieval between the host device and the non-volatile memory module, the digital switch circuit allows data to be channelled through the interface, the digital switch circuit and the non-volatile memory module; a second mode for wireless data transmission/reception between the non-volatile memory module and a remote data repository, the digital switch circuit allows data to be channelled through the digital switch circuit, the microcontroller and the wireless communications module; a third mode for transmission of instructions between the host device and the microcontroller, the digital switch circuit allows instructions to be channelled through the interface, and the digital switch circuit and so forth. It is preferable that the microcontroller receives instructions from the host device.

It is advantageous that the minimising of a processing load on the microcontroller reduces both heat generation by the microcontroller and power consumption leached from the host device. The host device may be, for example, a digital camera; a mobile phone; a positioning-navigation apparatus; a desktop computer; a portable computer and the like.

The data storage/retrieval on the non-volatile memory module may be carried out in a direct manner in the first mode without passing through the microcontroller.

In another aspect, there is provided a method for storing data in a portable storage device with wireless functionality. The portable storage device includes a digital switch circuit for controlling a flow of data in the portable storage device; a non-volatile memory module coupled to the digital switch circuit, the non-volatile memory module being for storing data; an interface coupled to the digital switch circuit for enabling the portable data storage device to be used for data transfer with a host device; a microcontroller coupled to the digital switch circuit for controlling the digital switch circuit; and a wireless communications module coupled to the microcontroller for wireless transmission/reception of data.

The method preferably includes three discrete modes, the three discrete modes being mode A, mode B and mode C. The mode A may include toggling of the digital switch circuit by the microcontroller to allow data to be channelled through the interface, the digital switch circuit and the non-volatile memory module for data storage/retrieval between the host device and the non-volatile memory module. The mode B may include toggling of the digital switch circuit by the microcontroller to allow data to be channelled through the digital switch circuit, the microcontroller and the wireless communications module for wireless data transmission/reception between the non-volatile memory module and a remote data repository. Finally, the mode C may include toggling of the digital switch circuit by the microcontroller to allow instructions to be channelled through the interface, and the digital switch circuit for transmission of instructions between the host device and the microcontroller. It is advantageous that the digital switch circuit diverts data away from the microcontroller and minimises a processing load on the microcontroller in the mode A.

It is advantageous that the minimising of a processing load on the microcontroller reduces both heat generation by the microcontroller and power consumption leached from the host device. The host device may be, for example, a digital camera; a mobile phone; a positioning-navigation apparatus; a desktop computer; a portable computer, and the like.

Preferably, data storage on the non-volatile memory module is carried out in a direct manner in the mode A without passing through the microcontroller.

DESCRIPTION OF FIGURES

In order that the invention may be fully understood and readily put into practical effect there shall now be described by way of non-limitative example only exemplary embodiments, the description being with reference to the accompanying illustrative drawings.

DESCRIPTION OF PREFERRED EMBODIMENTS

Figure 1:
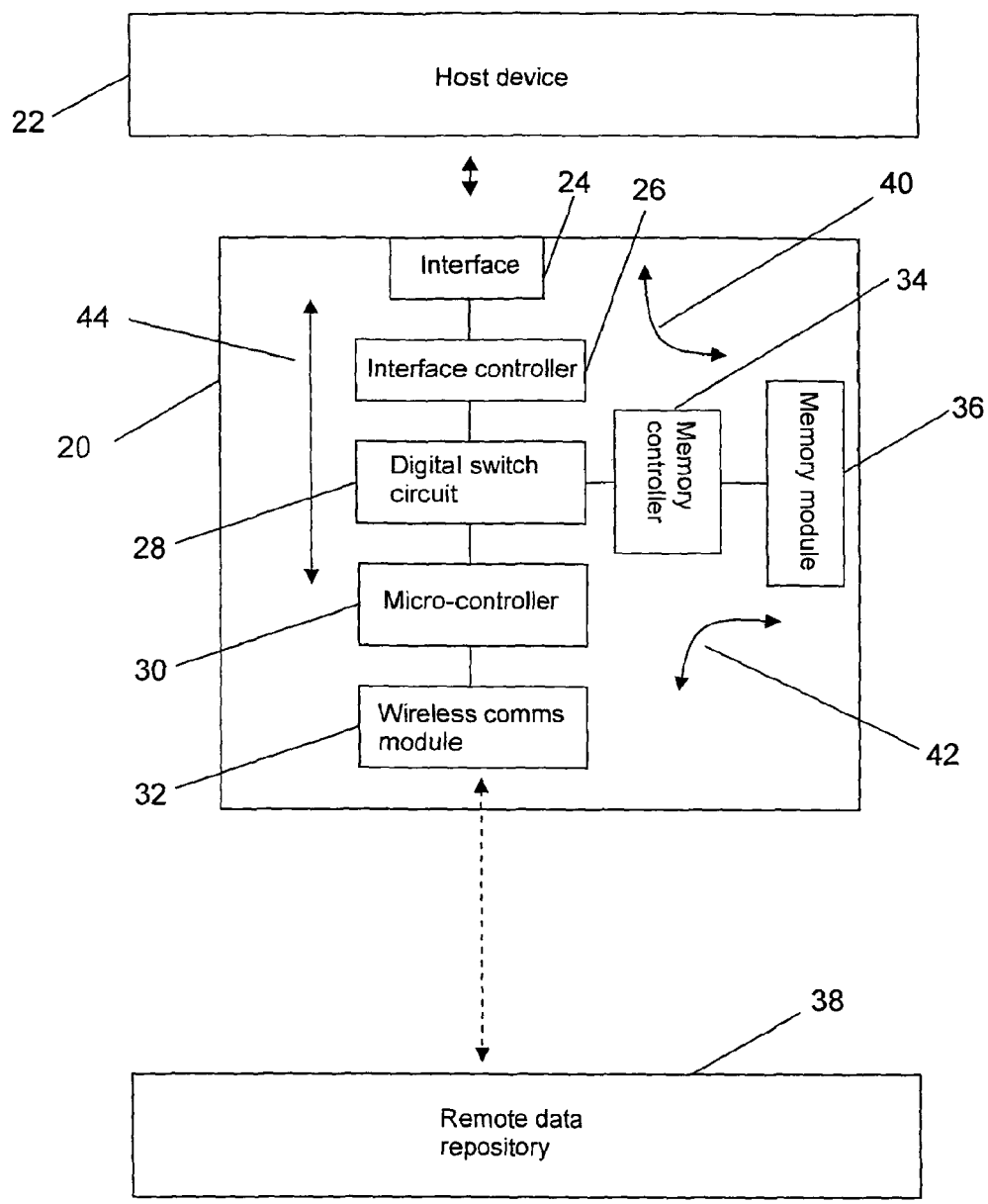
FIG. 1 shows a schematic view of a preferred embodiment of an apparatus of the present invention.

According to a preferred embodiment, there is shown in FIG. 1 a schematic representation of a portable data storage device 20 with wireless functionality. The portable data storage device 20 may have a physical form factor which is identical to either an SD data storage card or a CF data storage card. It should be noted that other physical form factors for the portable data storage device 20 may be possible as long as requisite components of the portable data storage device 20 as detailed in subsequent paragraphs are able to be functionally incorporated within a physical casing of any shape. It should also be noted that the portable data storage device 20 need not be in a form of a storage card. It may also be in a form of any portable data storage apparatus.

The portable storage device 20 includes a digital switch circuit 28 for controlling a flow of data in the portable storage device 20. The digital switch circuit 28 may comprise any suitable combination of circuit components and may employ any suitable circuit arrangement. The digital switch circuit 28 may be a single off-the-shelf component which is able to fit within the physical casing of the portable storage device 20.

The portable storage device 20 also includes a non-volatile memory module 36 coupled to the digital switch circuit 28, with the non-volatile memory module 36 being for storing data. The non-volatile memory module 36 may be a hard disk if the hard disk can be accommodated within the physical casing of the portable data storage device 20, but it is more likely that the non-volatile memory module 36 is in a form of solid-state (flash) memory. There may be a memory controller 34 controlling the non-volatile memory module 36.

There is also an interface 24 coupled to the digital switch circuit 28 for enabling the portable data storage device 20 to be used for data transfer with a host device 22. The host device 22 may include, for example, a digital camera, a mobile phone, a positioning-navigation apparatus, a desktop computer, a portable computer and so forth. The interface 24 may enable either a direct connection or a wireless connection between the portable storage device 20 and the host device 22. The interface 24 is preferably of a type which enables transfer of data at a rate of transfer exceeding 2 MB/s. This aspect is of some practical importance if the portable storage device 20 is used either for high speed photography or for storing/transferring quantities of data exceeding 4 GB.

The interface 24 is coupled to an interface controller 26 for controlling the interface 24.

The portable storage device 20 also includes a microcontroller 30 coupled to the digital switch circuit 28 for controlling the digital switch circuit 28. The microcontroller 30 receives instructions from the host device 22 and consequently carries out appropriate functions as per the instructions by controlling all requisite processes in the portable storage device 20. It should be noted that the microcontroller 30 may perform functions of the interface controller 26. The microcontroller 30 is also configured to control the digital switch circuit 28 in several modes which will be described in a subsequent portion of the description. There is also a wireless communications module 32 coupled to the microcontroller 30 for wireless transmission/reception of data. The wireless communications module 32 is for wireless transmission/reception of data and employs a wireless communications technology such as, for example, ultra wide band, Bluetooth®, cellular phone network, Wi-fi and so forth.

The microcontroller 30 is configured to toggle amongst three discrete modes of the digital switch circuit 28. Each of the three discrete modes of the digital switch circuit 28 is toggled to carry out specific tasks for the portable data storage device 20. The specific tasks for the portable data storage device 20 may include data storage/retrieval between the host device 22 and the non-volatile memory module 36, wireless data transmission/storage between the non-volatile memory module 36 and a remote data repository 38, and transmission of instructions between the host device 22 and the microcontroller 30. It should be appreciated that the remote data repository 38 may include either similar host devices 22, or online storage facilities.

In a first mode for the data storage/retrieval between the host device 22 and the non-volatile memory module 36; the digital switch circuit 28 allows data to be channelled through the interface 24, the digital switch circuit 28 and the non-volatile memory module 36. The flow of data in the first mode is represented by a first bi-arrowed line 40. It should be appreciated that the digital switch circuit 28 diverts data away from the microcontroller 30 and minimises a processing load on the microcontroller 30 in the first mode as the flow of data between the host device 22 and the non-volatile memory module 36 does not pass through the microcontroller 30. It should be appreciated that the minimising of the processing load on the microcontroller 30 reduces both heat generation by the microcontroller 30 and power consumption (leached from the host device 22). It should also be noted that the data storage/retrieval on the non-volatile memory module 36 is carried out in a direct manner in the first mode as the data does not pass through the microcontroller 30.

In a second mode for the wireless data transmission/reception between the non-volatile memory module 36 and the remote data repository 38, the digital switch circuit 28 allows data to be channelled through the digital switch circuit 28, the microcontroller 30 and the wireless communications module 32. The flow of data in the second mode is represented by a second bi-arrowed line 42. It should be appreciated that the digital switch circuit 28 diverts data to the microcontroller 30 in the second mode. In the second mode, the microcontroller 30 is activated to control the wireless communications module 32 and thus, passing the data through the microcontroller 30 does not require additional power consumption (leached from the host device 22).

In a third mode for transmission of instructions between the host device 22 and the microcontroller 30, the digital switch circuit 28 allows instructions to be channelled through the interface 24, and the digital switch circuit 28. The flow of instructions in the third mode is represented by a third bi-arrowed line 44. It should be appreciated that the digital switch circuit 28 diverts data to the microcontroller 30 in the third mode as the microcontroller 30 receives instructions from the host device 22 so as to control the portable data storage device 20 in an appropriate manner.

It should be appreciated that the three discrete modes of the digital switch circuit 28 ensure that the microcontroller 30 is only activated when necessary, thus minimising the processing load on the microcontroller 30.

It should be appreciated that the aforementioned three discrete modes may be toggled sequentially to enable a specific task(s) for the portable data storage device 20 to be carried out. Whichever mode the digital switch circuit 28 is toggled to depends upon the instructions transmitted from the host device 22. to the microcontroller 30. The microcontroller 30 toggles the digital switch circuit 28 to an appropriate mode subsequent to receiving instructions from the host device 22. For example, the digital switch circuit 28 would need to be toggled to a third mode whenever instructions are transmitted from the host device 22. Subsequently, the digital switch circuit 28 may be toggled to either the first mode or the second mode depending on the instructions transmitted from the host device 22.

Figure 2:
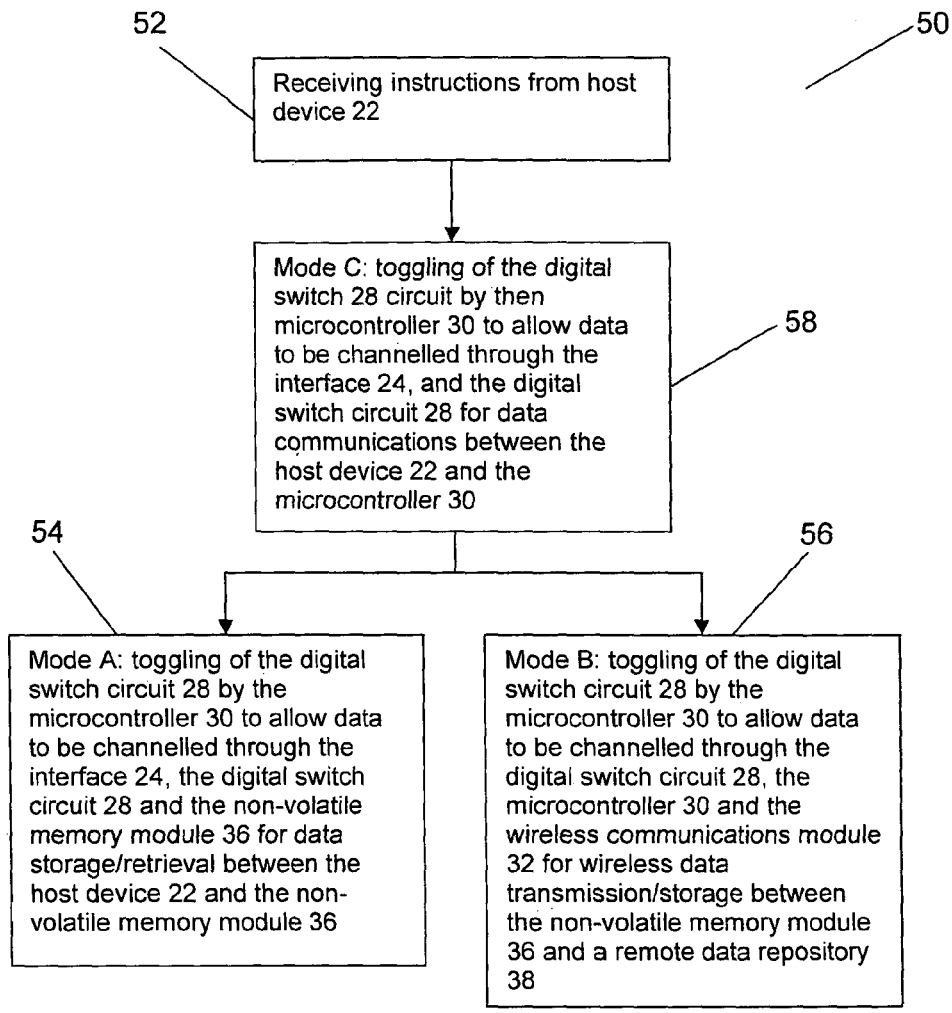
FIG. 2 shows a process flow for a method of the present invention.

Referring to FIG. 2, there is provided a process flow for a preferred embodiment of a method 50 for storing data in a portable storage device with wireless functionality. The portable storage device can be of a form as described in the preceding paragraphs. Reference will be made to the reference labels in FIG. 1 to enhance clarity of the description of the method 50 in the subsequent paragraphs.

The method 50 includes three discrete modes, the three discrete modes being mode A, mode B and mode C. Firstly, the method 50 includes receiving instructions from the host device 22 (52). The host device 22 may include, for example, a digital camera, a mobile phone, a positioning-navigation apparatus, a desktop computer, a portable computer and so forth. When instructions are received from the host device 22, mode C of the digital switch circuit 28 is toggled by the microcontroller 30 (58) to allow the instructions to be channelled through the interface 24, and the digital switch circuit 28 to the microcontroller 30.

Subsequently, the digital switch circuit 28 is toggled by the microcontroller 30 to either mode A (54) or mode B (56), the mode being dependent on the instructions received from the host device 22.

Thus, if the instructions relate to data storage/retrieval between the host device 22 and the non-volatile memory module 36, the digital switch circuit 28 is toggled by the microcontroller 30 to mode A whereby the digital switch circuit 28 allows data to be channelled through the interface 24, the digital switch circuit 28 and the non-volatile memory module 36. Alternatively, if the instructions relate to wireless data transmission/reception between the non-volatile memory module 36 and the remote data repository 38, the digital switch circuit 28 is toggled by the microcontroller 30 to mode B whereby the digital switch circuit 28 allows data to be channelled through the digital switch circuit 28, the microcontroller 30 and the wireless communications module 32. It should be appreciated that the remote data repository 38 may include either similar host devices 22, or online storage facilities.

It is appreciated that the digital switch circuit 28 diverts data away from the microcontroller 30 and minimises a processing load on the microcontroller in the mode A as the flow of data between the host device 22 and the non-volatile memory module 36 does not pass through the microcontroller 30. It should be appreciated that the minimising of the processing load on the microcontroller 30 reduces both heat generation by the microcontroller 30 and power consumption (leached from the host device 22). It should also be noted that the data storage/retrieval on the non-volatile memory module 36 is carried out in a direct manner in the first mode as the data does not pass through the microcontroller 30.

Whilst the foregoing description has described exemplary embodiments, it will be understood by those skilled in the technology concerned that many variations in details of design, construction and/or operation may be made without departing from the present invention.

The invention claimed is:

1. A portable data storage device with wireless functionality, the portable storage device including:
   a digital switch circuit for controlling a flow of data in the portable storage device;
   a non-volatile memory module coupled to the digital switch circuit, the non-volatile memory module being for storing data;
   an interface coupled to the digital switch circuit for enabling the portable data storage device to be used for data transfer with a host device via an electronic connection;
   a microcontroller coupled to the digital switch circuit for controlling the digital switch circuit; and
   a wireless communications module coupled to the microcontroller for wireless transmission/reception of data;
   wherein the microcontroller is configured to toggle amongst a plurality of discrete modes of the digital switch circuit such that in at least one of the plurality of discrete modes the digital switch circuit diverts data away from the microcontroller to reduce a processing load on the microcontroller.

2. The portable data storage device of claim 1, wherein the plurality of discrete modes of the digital switch circuit are:
   a first mode for data storage/retrieval between the host device and the non-volatile memory module, the digital switch circuit allows data to be channelled through the interface, the digital switch circuit and the non-volatile memory module;
   a second mode for wireless data transmission/reception between the non-volatile memory module and a remote data repository, the digital switch circuit allows data to be channelled through the digital switch circuit, the microcontroller and the wireless communications module; and
   a third mode for transmission of instructions between the host device and the microcontroller, the digital switch circuit allows instructions to be channelled through the interface, and the digital switch circuit.

3. The portable data storage device of either claim 1 or 2, wherein the microcontroller receives instructions from the host device.

4. The portable data storage device of claim 1, wherein the minimising of a processing load on the microcontroller reduces both heat generation by the microcontroller and power consumption leached from the host device.

5. The portable data storage device of claim 1, wherein the data storage/retrieval on the non-volatile memory module is carried out in a direct manner in the first mode without passing through the microcontroller.

6. The portable data storage device of claim 1, wherein the host device is selected from a group comprising:
   a digital camera;
   a mobile phone;
   a positioning-navigation apparatus;
   a desktop computer; and
   a portable computer.

7. A method for storing data in a portable storage device with wireless functionality, the portable storage device including:
   a digital switch circuit for controlling a flow of data in the portable storage device;
   a non-volatile memory module coupled to the digital switch circuit, the non-volatile memory module being for storing data;

an interface coupled to the digital switch circuit for enabling the portable data storage device to be used for data transfer with a host device via an electronic connection;

a microcontroller coupled to the digital switch circuit for controlling the digital switch circuit; and a wireless communications module coupled to the microcontroller for wireless transmission/reception of data;

the method including three discrete modes, the three discrete modes being mode A, mode B and mode C, the mode A including toggling of the digital switch circuit by the microcontroller to allow data to be channelled through the interface, the digital switch circuit and the non-volatile memory module for data storage/retrieval between the host device and the non-volatile memory module, the mode B including toggling of the digital switch circuit by the microcontroller to allow data to be channelled through the digital switch circuit, the microcontroller and the wireless communications module for wireless data transmission/reception between the non-volatile memory module and a remote data repository, and the mode C including toggling of the digital switch circuit by the microcontroller to allow instructions to be channelled through the interface, and the digital switch circuit for transmission of instructions between the host device and the microcontroller, wherein the digital switch circuit diverts data away from the microcontroller and minimises a processing load on the microcontroller in the mode A.

8. The method of claim 7, wherein the minimising of a processing load on the microcontroller reduces both heat generation by the microcontroller and power consumption leached from the host device.

9. The method of either claim 7 or 8, wherein data storage on the non-volatile memory module is carried out in a direct manner in the mode A without passing through the microcontroller.

10. The method of claim 7, wherein the host device is selected from a group comprising:
a digital camera;
a mobile phone;
a positioning-navigation apparatus;
a desktop computer; and
a portable computer.

\* \* \* \* \*